US012699621B2

(12) United States Patent
Pasumarthi

(10) Patent No.: US 12,699,621 B2
(45) Date of Patent: Aug. 4, 2026

(54) ENHANCED TECH SUPPORT BASED ON CUSTOMER FEEDBACK

(71) Applicant: Bank of America Corporation, Charlotte, NC (US)

(72) Inventor: Kalyan V. Pasumarthi, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 32 days.

(21) Appl. No.: 18/426,477

(22) Filed: Jan. 30, 2024

(65) Prior Publication Data

US 2025/0245094 A1 Jul. 31, 2025

(51) Int. Cl.
| | |
|---|---|
| *G06F 11/00* | (2006.01) |
| *G06F 11/07* | (2006.01) |
| *G06F 11/3668* | (2025.01) |
| *G06F 40/205* | (2020.01) |

(52) U.S. Cl.
CPC ...... *G06F 11/0793* (2013.01); *G06F 11/3688* (2013.01); *G06F 11/3692* (2013.01); *G06F 40/205* (2020.01)

(58) Field of Classification Search
CPC ............. G06F 11/0793; G06F 11/3688; G06F 11/3692; G06F 40/205
See application file for complete search history.

(56) References Cited

U.S. PATENT DOCUMENTS

| | | | | |
|---|---|---|---|---|
| 9,069,737 | B1 * | 6/2015 | Kimotho | ............... G06F 11/079 |
| 2005/0160318 | A1 * | 7/2005 | Di Luoffo | ........... G06F 11/0709 |
| | | | | 714/25 |
| 2020/0183772 | A1 * | 6/2020 | Bangalore | ........... G06F 11/0793 |
| 2024/0086445 | A1 * | 3/2024 | Cakir | ...................... G06N 5/04 |
| 2024/0152442 | A1 * | 5/2024 | Sethi | .................. G06F 11/0793 |
| 2025/0080395 | A1 * | 3/2025 | Agarwal | ............. H04L 41/5074 |

* cited by examiner

*Primary Examiner* — Joshua P Lottich
(74) *Attorney, Agent, or Firm* — Weiss & Arons LLP

(57) ABSTRACT

Systems and methods are provided for troubleshooting a user inquiry using an artificial intelligence ("AI") engine. The systems and methods may receive the user inquiry at the AI engine. The systems and methods may parse the user inquiry to identify an issue category. The systems and methods may retrieve a troubleshooting guide including a plurality of consecutive steps. The systems and methods may use the AI engine to associate each of the plurality of steps with one or more characteristics. The systems and methods may retrieve user data associated with the characteristics. The systems and methods may determine one or more of the plurality of consecutive steps to skip based on the retrieved user data. The systems and methods may execute the non-skipped consecutive steps. The systems and methods may determine a resolution to the issue.

12 Claims, 4 Drawing Sheets

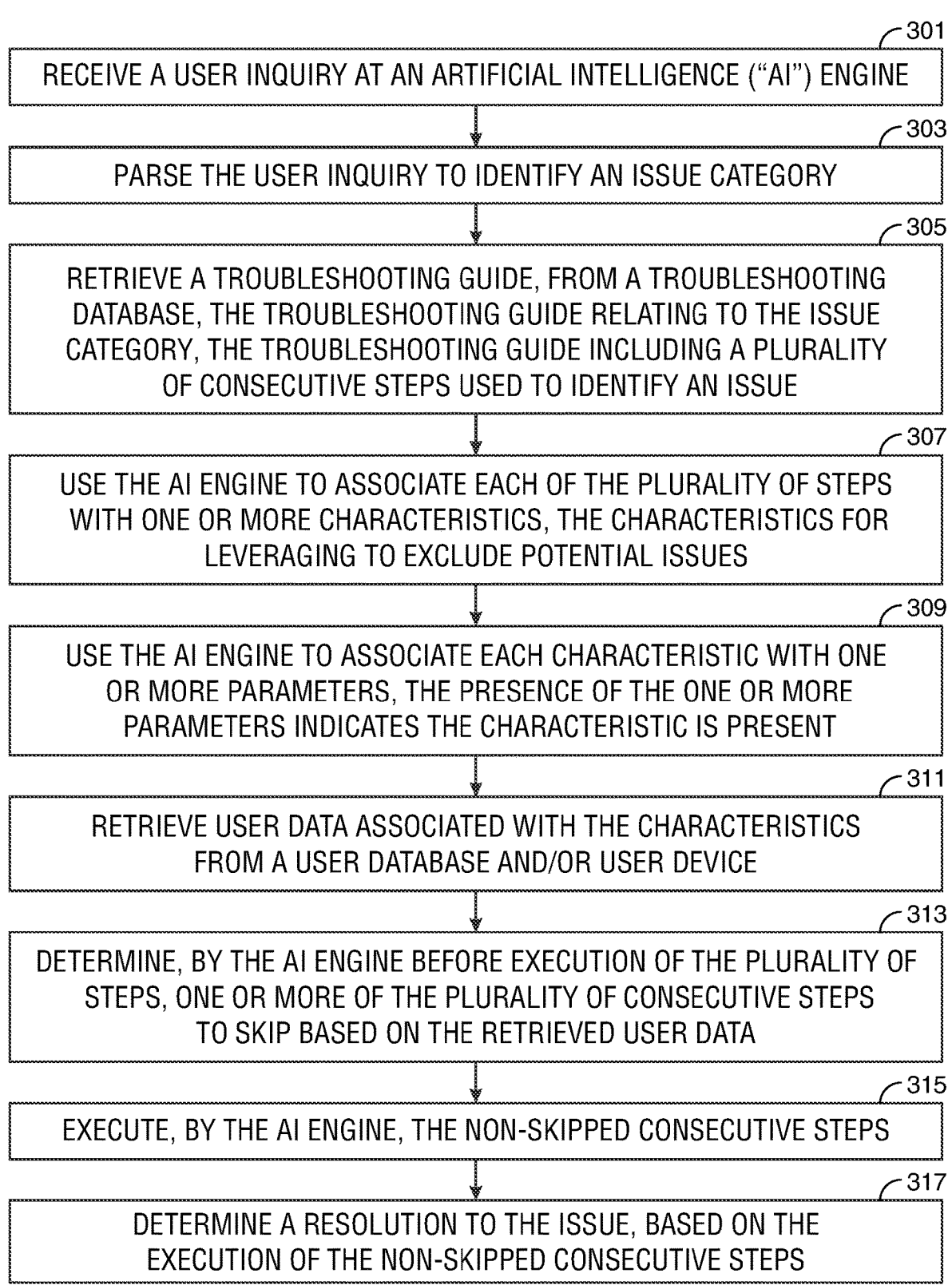

301
RECEIVE A USER INQUIRY AT AN ARTIFICIAL INTELLIGENCE ("AI") ENGINE

303
PARSE THE USER INQUIRY TO IDENTIFY AN ISSUE CATEGORY

305
RETRIEVE A TROUBLESHOOTING GUIDE, FROM A TROUBLESHOOTING DATABASE, THE TROUBLESHOOTING GUIDE RELATING TO THE ISSUE CATEGORY, THE TROUBLESHOOTING GUIDE INCLUDING A PLURALITY OF CONSECUTIVE STEPS USED TO IDENTIFY AN ISSUE

307
USE THE AI ENGINE TO ASSOCIATE EACH OF THE PLURALITY OF STEPS WITH ONE OR MORE CHARACTERISTICS, THE CHARACTERISTICS FOR LEVERAGING TO EXCLUDE POTENTIAL ISSUES

309
USE THE AI ENGINE TO ASSOCIATE EACH CHARACTERISTIC WITH ONE OR MORE PARAMETERS, THE PRESENCE OF THE ONE OR MORE PARAMETERS INDICATES THE CHARACTERISTIC IS PRESENT

311
RETRIEVE USER DATA ASSOCIATED WITH THE CHARACTERISTICS FROM A USER DATABASE AND/OR USER DEVICE

313
DETERMINE, BY THE AI ENGINE BEFORE EXECUTION OF THE PLURALITY OF STEPS, ONE OR MORE OF THE PLURALITY OF CONSECUTIVE STEPS TO SKIP BASED ON THE RETRIEVED USER DATA

315
EXECUTE, BY THE AI ENGINE, THE NON-SKIPPED CONSECUTIVE STEPS

317
DETERMINE A RESOLUTION TO THE ISSUE, BASED ON THE EXECUTION OF THE NON-SKIPPED CONSECUTIVE STEPS

FIG. 3

ENHANCED TECH SUPPORT BASED ON CUSTOMER FEEDBACK

FIELD OF TECHNOLOGY

Aspects of the disclosure relate to technology for troubleshooting technical issues.

BACKGROUND OF THE DISCLOSURE

Customers may experience issues when attempting to perform actions on a device. The actions may be related to viewing customer account information, making payments, submitting an inquiry, transferring money and any other suitable action performed in an application. The customer may require help from a technical support agent. Customers may desire to interact with or request help from an enterprise. The customers may call a customer support agent belonging to the enterprise.

Currently, technical support agents and customer support agents work to resolve issues using troubleshooting guides. The troubleshooting guides include many steps. The many steps may include a series of questions. Each question of the series of questions may not be pertinent to the customer's issue. The answers to some of the series of questions may seem obvious to the customer. The customer may find answering the series of questions frustrating.

Therefore, it would be desirable to provide interactive technical support to customer using an artificial intelligence ("AI") engine and customer provided data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3 shows an illustrative flowchart in accordance with principles of the disclosure.

DETAILED DESCRIPTION OF THE DISCLOSURE

Figure 1:
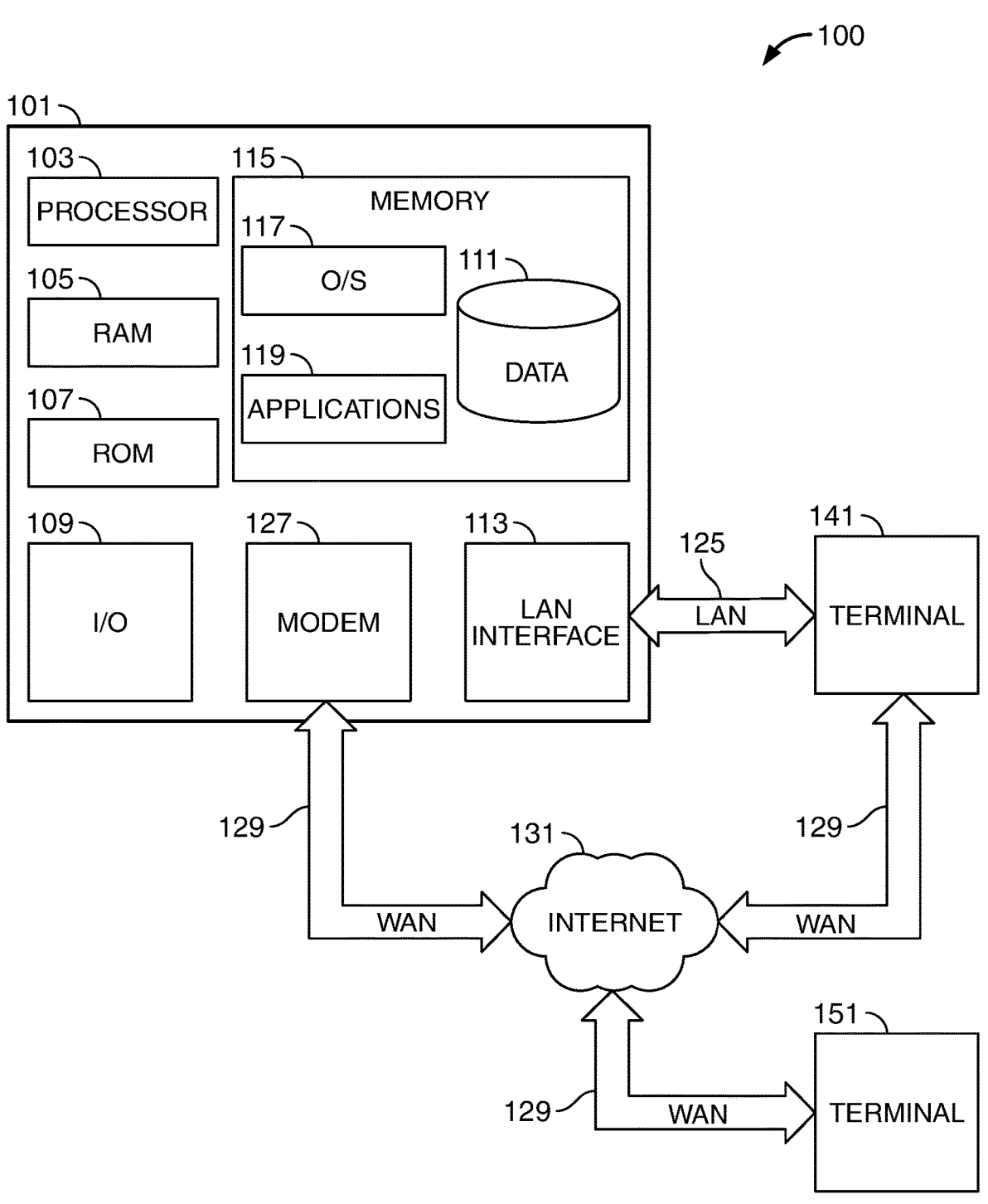
FIG. 1 shows an illustrative apparatus in accordance with principles of the disclosure.

Systems and methods are provided for troubleshooting a user inquiry using an artificial intelligence ("AI") engine. The AI engine may provide information useful for improving a user troubleshooting experience.

The systems and methods may include receiving a user inquiry at an AI engine. The user inquiry may be received from the user via a phone call, text message, email, chat application or any other suitable medium. The user inquiry may include a description of the issue the user is experiencing. The AI engine may parse the user inquiry to identify issue categories. Issue categories may include connection issues, action issues, application issues, data issues and any other suitable issues.

The AI engine may be trained to identify issue categories. The AI engine may identify an issue category of the user inquiry based on keywords parsed in the user inquiry. The AI engine may include a natural language processing ("NLP")

program. The keywords may be identified using the NLP. The NLP may be preprogrammed with the keywords.

Each issue category may include a corresponding troubleshooting guide. Each troubleshooting guide may include steps on how to identify an issue. The issue may belong to the issue category of the corresponding troubleshooting guide. Each troubleshooting guide may include a plurality of consecutive steps used to identify the issue. The troubleshooting guides may be stored in a database. The troubleshooting guides may be stored in the AI engine.

The plurality of consecutive steps may include 2, 3, 4, 5, 6 or any suitable number of steps. The steps may include a question asked to the user. The steps may include looking for information. The steps may include checking for the presence of characteristics. The user may answer the question to advance to the next step. The AI engine may use each answer in order to identify the issue. Once the AI engine identifies the issue the AI engine may stop executing the plurality of consecutive steps. Once the AI engine identifies the issue the AI engine may direct the user how to resolve the issue. Not all steps may be necessary to identify the issue.

Each question may prompt the user to input information. The information may be related to a characteristic. The user may respond to the prompt. The response may indicate the presence of the characteristic or lack thereof. Upon the user response the step may be complete. When the step is complete the AI engine may move on to the next step. The characteristics may be for example internet connectivity, acceptance of cookies, application connectivity, and any other suitable types of information needed to resolve troubleshooting issues. The presence of the characteristic may be used to exclude potential issues. The lack of the characteristic may be used to indicate potential issues.

Upon receiving the user inquiry the AI engine may determine an issue category. Upon determining the issue category, the AI engine may retrieve the corresponding troubleshooting guide. Upon retrieving the corresponding troubleshooting guide, the AI engine may parse the plurality of steps of the troubleshooting guide. Upon parsing the plurality of steps, the AI engine may associate each of the plurality of steps with one or more characteristics.

The AI engine may execute each of the plurality of consecutive steps to identify the issue. The database may include resolving steps the user may take to resolve each issue. The AI engine may include the resolving steps. Once the AI engine identifies the issue, the AI engine may execute the resolving steps. The AI engine may share the resolving steps with the user.

The AI engine may skip one or more of the plurality of steps. The AI engine may determine which of the steps to skip based on user data. Upon associating each of the plurality of steps with one or more characteristics, the AI engine may associate each of the characteristics with one or more parameters. The parameters may be identified using the user data. The parameters may indicate the presence of the associated characteristic. The user data may include session data, ID data, telemetry data and any other data related to the parameters. For example, the data may include when the user tried to access the application, how long the user was logged in and any other data that may be related to the parameters. The user data may be retrieved from a user device. The user data may be retrieved from a user database. The user database may include information relating to the user, such as previous session data and previous session activity. The AI engine may prompt the user to permit the AI engine to retrieve the user data. The AI engine may prompt the user to supply additional user data.

The parameters may include information that may indicate the presence of an associated characteristic. For example, when the characteristic is internet connectivity, the parameter may be an indication of connectivity to the internet. The indication in the previous example may be data suggesting the user is currently connected to a session in an internet application. When the AI engine identifies a parameter is present based on the user data, the AI engine may identify that the associated characteristic is present. When the AI engine identifies that the associated characteristic is present the AI engine may skip the associated step in the troubleshooting guide. When the AI engine cannot identify the presence of any parameters that are associated with a characteristic, that characteristic may be undetermined. The AI engine may execute the plurality of steps associated with the undetermined characteristics.

The AI engine may skip the step associated with the characteristic whose associated parameters were verified to be present in the parsed user data. The AI engine may skip steps dependent upon the step associated with the characteristic.

The AI engine may prevent the skipping of steps. The AI engine may prevent the skipping of steps even when the associated characteristic is verified to be present. The AI engine may prevent the skipping of steps when an intervening characteristic is verified to be present. The intervening characteristic may indicate that the associated characteristic cannot be used to answer the question of the step. The intervening characteristic may indicate that the associated characteristic is absent. The ambiguity present based on the intervening characteristic may prevent the AI engine from skipping the step.

The AI engine may determine which parameters are present based on the user data. The AI engine may determine which characteristics are present based on the parameters. The AI engine may determine the issue based on the characteristics present. The AI engine may identify the issue without executing any of the plurality of steps. The AI engine may skip all of the plurality of steps. The AI engine may direct the user how to resolve the issue when all of the steps are skipped.

The AI engine may be trained before the AI engine goes live. The AI engine may be trained before the user inquiry is received at the AI engine. The AI engine may be trained through supervised learning, unsupervised learning, and/or any other suitable training methods or combinations thereof.

The training may include feeding first feed data to the untrained AI engine. The first feed data may include feed parameters. The feed parameters may include an association with respective characteristics. The untrained AI engine may analyze the feed parameters and their respective characteristics. Through the analysis the untrained AI engine may learn which parameters are associated with each characteristic.

The training may include feeding first test data to the untrained AI engine. The first test data may include test parameters without an association with respective characteristics. The untrained AI engine may analyze the test parameters. The untrained AI engine may associate the test parameters with respective characteristics based on the associations learnt via the first feed data. The associations made by the untrained AI engine may be validated to ensure that the untrained AI engine correctly matched the test parameters to the characteristics. When the AI engine does not reach a threshold characteristic percentage of correct matches the AI engine may be retrained. The threshold characteristic percentage may be 95%, 96%, 97% or any other suitable percentage.

Retraining the AI may include feeding the untrained AI new first feed data. The new first feed data may include new feed parameters. The new feed parameters may include new associations with respective characteristics. The retraining may include feeding the AI engine the first test data again. The AI engine may associate the test parameters with respective characteristics again. The associations made by the AI engine may be validated to ensure that the test parameters correctly match the characteristics. When the AI engine does not reach the threshold characteristic percentage again, the AI engine may be retrained with additional new first feed data. The AI engine may be retrained until reaching the threshold characteristic percentage.

The training may include feeding second feed data to the untrained AI engine. The second feed data may include feed characteristics. The feed characteristics may include an association with a respective step of a plurality of steps. The untrained AI engine may analyze the feed characteristics and their respective steps. Through the analysis the untrained AI engine may learn which characteristics are associated with each step.

The training may include feeding second test data to the untrained AI engine. The second test data may include test characteristics without an association with a respective step. The untrained AI engine may analyze the test characteristics. The untrained AI engine may associate the test characteristics with the respective step based on the associations learnt via the second feed data. The associations made by the untrained AI engine may be validated to ensure that the untrained AI engine correctly matched the test characteristics to the plurality of steps. When the AI engine does not reach a threshold steps percentage of correct matches the AI engine may be retrained. The threshold steps percentage may be 95%, 96%, 97% or any other suitable percentage.

Retraining the AI may include feeding the untrained AI new second feed data. The new second feed data may include new feed characteristics. The new feed characteristics may include new associations with respective steps. The retraining may include feeding the AI engine the second test data again. The AI engine may associate the test characteristics with respective steps again. The associations made by the AI engine may be validated to ensure that the test characteristics correctly match the steps. When the AI engine does not reach the threshold steps percentage again, the AI engine may be retrained with additional new second feed data. The AI engine may be retrained until reaching the threshold steps percentage.

The training may be repeated for each troubleshooting guide.

The AI engine may be trained when it goes live. The AI engine may prompt the user upon completion of each step to indicate whether the respective step was effective in identifying the issue. The user response to the prompt may help the AI engine identify whether the AI engine correctly identified parameters in the user data. The user response may help the AI engine to correctly identify parameters in the future. The user response may be used to recursively train the AI engine. The user response may indicate the AI engine needs retraining.

The AI engine may prompt the user at the end of the troubleshooting session. The prompt may ask the user for suggestions to help improve the AI engine. The user suggestions may be processed by a development team to improve the AI engine.

The AI engine may be monitored when it goes live. The monitoring may include verifying the associations made based on the user data. When the associations do not meet the threshold steps percentage or the threshold characteristics percentage the AI engine may be taken down and retrained. The AI engine may be monitored during every session, every other session or any suitable number of sessions with respective users.

The monitoring may include analyzing the user data retrieved. The analyzing the user data may include determining whether the user data is relevant or whether there is enough user data. The monitoring may be used to direct the AI engine which data to collect. The monitoring may be used to direct the AI engine which data to not collect.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 along with any other data 111 needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) along with any data needed for the operation of the apparatus. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks.

Computer 101 may include a network interface controller (not shown), which may include a modem 127 and LAN interface or adapter 113, as well as other components and adapters (not shown). When used in a LAN networking environment, computer 101 is connected to LAN 125 via a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

In an embodiment, one or more programs, or aspects of a program, may use one or more AI/ML algorithm(s).

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked via a communications network, e.g., cloud-based applications. In a distributed computing environment, program modules may be located in both local and remote computer storage media including memory storage devices.

Figure 2:
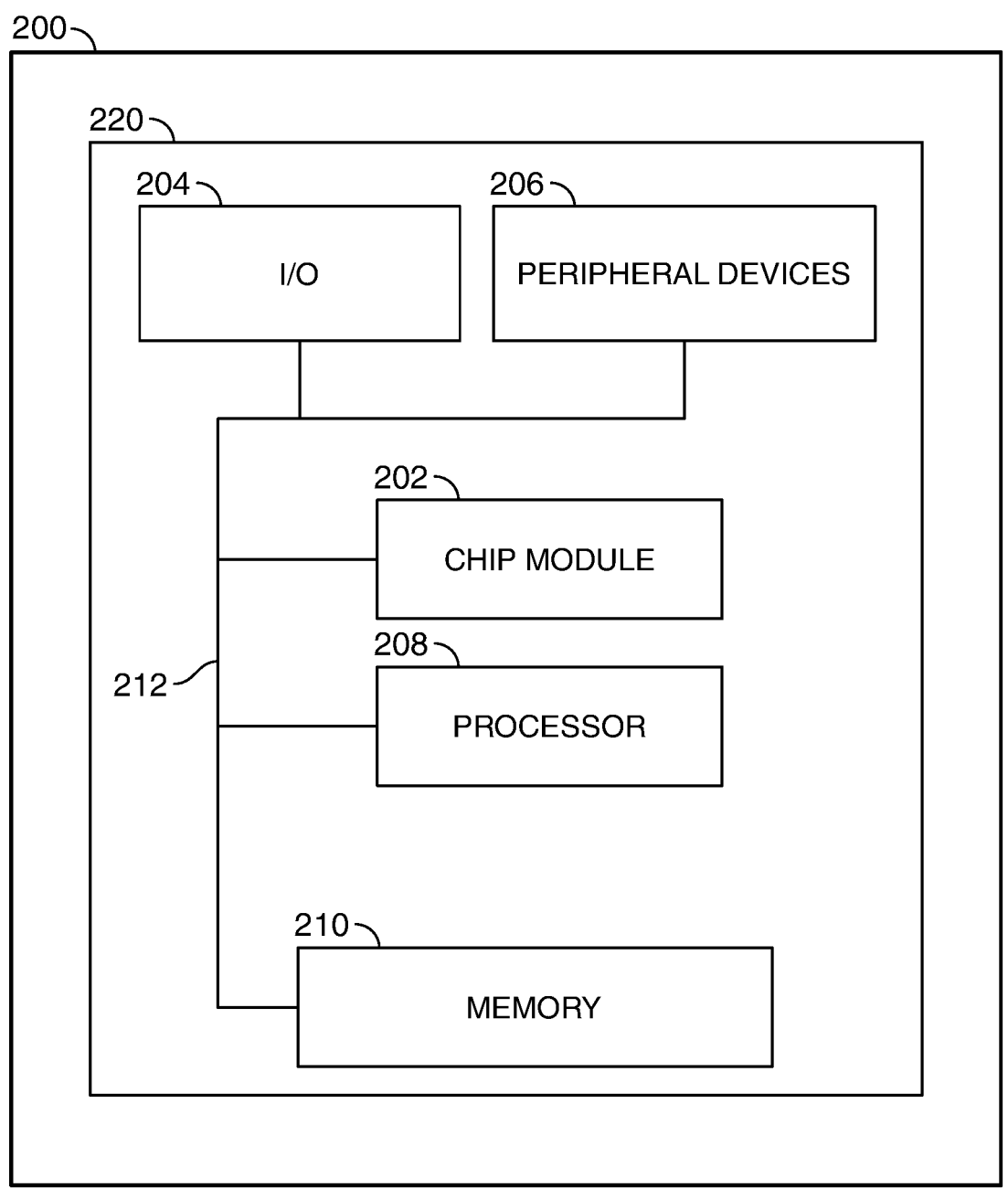
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3 shows an illustrative flowchart in accordance with principles of the disclosure. At step 301, methods may include receiving a user inquiry at an artificial intelligence ("AI") engine. At step 303, methods may include parsing the user inquiry to identify an issue category. At step 305, methods may include retrieving a troubleshooting guide, from a troubleshooting database, the troubleshooting guide relating to the issue category, the troubleshooting guide including a plurality of consecutive steps used to identify an issue. At step 307, methods may include using the AI engine to associate each of the plurality of steps with one or more characteristics, the characteristics for leveraging to exclude potential issues. At step 309, methods may include using the AI engine to associate each characteristic with one or more parameters, the presence of the one or more parameters indicates the characteristic is present.

At step 311, methods may include retrieving user data associated with the characteristics from a user database and/or user device. At step 313, methods may include determining, by the AI engine before execution of the plurality of steps, one or more of the plurality of consecutive steps to skip based on the retrieved user data. At step 315, methods may include executing, by the AI engine, the non-skipped consecutive steps. At step 317, methods may include determining a resolution to the issue, based on the execution of the non-skipped consecutive steps.

Figure 4:
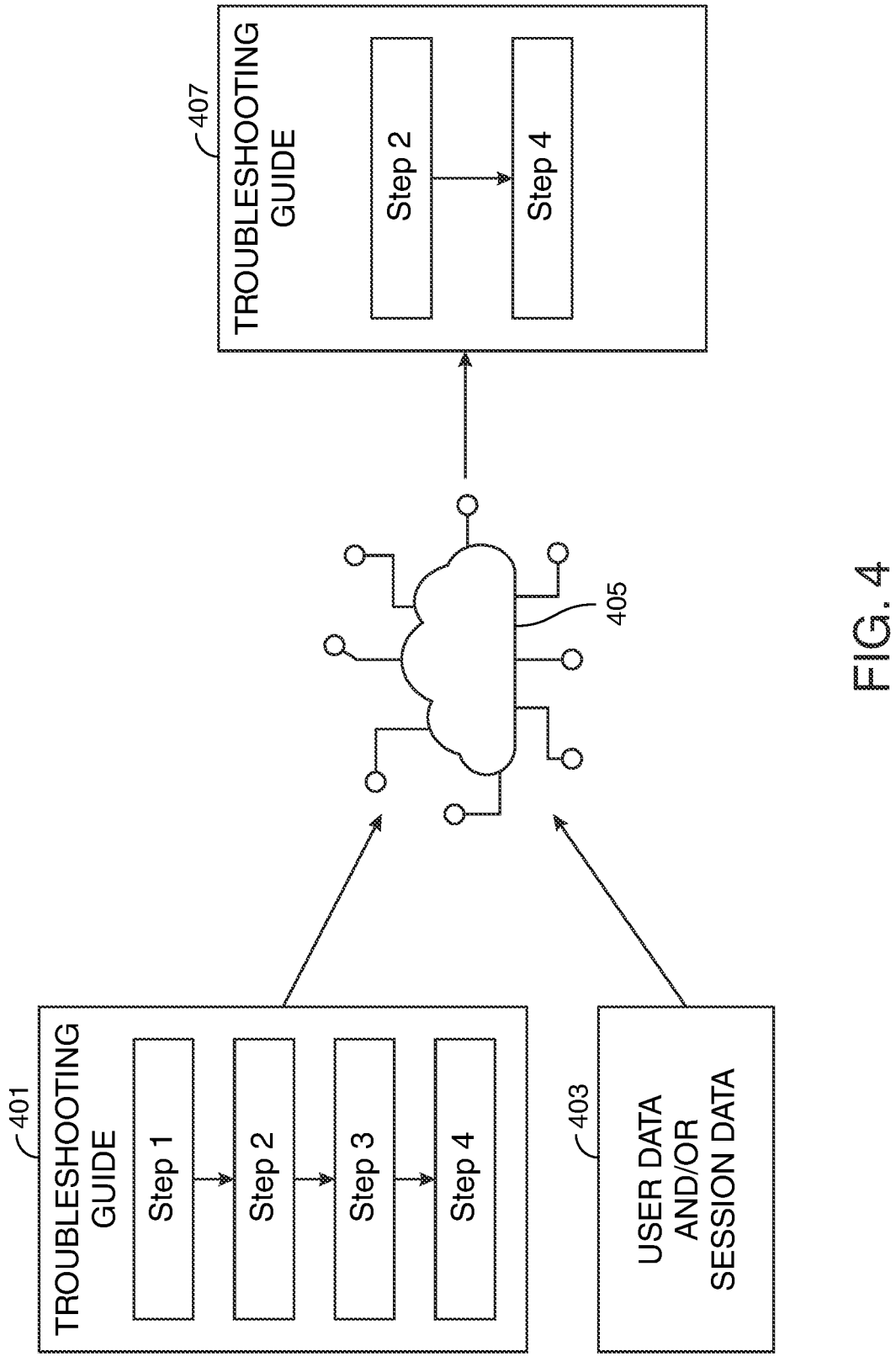
FIG. 4 shows an illustrative diagram in accordance with principles of the disclosure.

FIG. 4 shows an illustrative diagram in accordance with principles of the disclosure. Troubleshooting guide 401 may include 4 steps. Troubleshooting guide 401 may include 2, 3, 5, 6 or any suitable number of steps. Incoming data 403 may include user data and/or session data. The user data and/or session data may come from a user database and/or a user device. The user data and/or session data may include a user inquiry. Artificial intelligence ("AI") engine 405 may receive troubleshooting guide 401 and incoming data 403. AI engine 405 may parse incoming data 403 and steps of troubleshooting guide 401 to determine if any steps can be skipped. Upon a determination of skipped steps AI engine 405 may output new troubleshooting guide 407. New troubleshooting guide 407 may be the same as troubleshooting guide 401 with some steps skipped.

Thus, systems and methods for enhanced tech support based on customer feedback have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for improving an automated user troubleshooting system, the method comprising:
    training an artificial intelligence ("AI") engine by:
        feeding first feed data to the untrained AI engine, the first feed data including feed parameters which are associated with one or more characteristics for leveraging to exclude potential issues;
        analyzing, by the untrained AI engine, the first feed data;
        associating, by the untrained AI engine, the feed parameters to the characteristics;
        feeding first test data to the untrained AI engine, the first test data including test parameters which are unassociated with the characteristics;
        analyzing, by the untrained AI engine the test data;
        associating, by the untrained AI engine, the test parameters to the characteristics;
        validating that the untrained AI engine correctly matched the test parameters to the characteristics;
        feeding second feed data to the untrained AI engine, the second feed data including feed characteristics which are associated with one or more of a plurality of consecutive steps stored in a troubleshooting database;
        analyzing, by the untrained AI engine, the second feed data;
        associating, by the untrained AI engine, the feed characteristics to the one or more of the plurality of consecutive steps;
        feeding second test data to the untrained AI engine, the second test data including test characteristics which are unassociated with the one or more of the plurality of consecutive steps;
        analyzing, by the untrained AI engine, the second test data;
        associating, by the untrained AI engine, the test characteristics to the one or more of the plurality of consecutive steps;
        validating that the untrained AI engine correctly matched the test characteristics to the one or more of the plurality of consecutive steps; and
        retraining the untrained AI engine until the validation steps reach a threshold of at least 95% correct matches;
    receiving a user inquiry at the AI engine;
    parsing the user inquiry to identify an issue category;
    retrieving, from the troubleshooting database, a troubleshooting guide that:
        relates to the issue category; and includes the plurality of consecutive steps used to identify an issue;
    using the AI engine to associate each of the plurality of steps with one or more of the characteristics;
    using the AI engine to associate each characteristic with one or more parameters, the presence of the one or more parameters indicating the characteristic is present;
    retrieving user data associated with the characteristics from a user database and/or user device;
    determining, by the AI engine before execution of the plurality of steps, one or more of the plurality of consecutive steps to skip based on the retrieved user data, the determining comprising:
        parsing the user data;
        verifying whether one or more parameters of the one or more characteristics are present in the user data; and
        skipping each step of the plurality of consecutive steps associated with the characteristic whose associated parameters were verified to be present in the parsed user data;
    executing, by the AI engine, non-skipped consecutive steps to identify the issue, wherein executing the non-skipped consecutive steps involves executing fewer steps than executing the plurality of consecutive steps;
    determining resolution steps for a resolution to the issue based on the execution of the non-skipped consecutive steps; and
    executing the resolution steps, wherein the resolution steps include one or more of internet connectivity and internet cookie acceptance steps.

2. The method of claim 1 further comprising upon completion of each non-skipped consecutive step prompting the user to indicate whether the respective non-skipped consecutive step was effective in identifying the issue.

3. The method of claim 2 wherein a user response to the prompt upon completion of each non-skipped consecutive step is used to recursively train the AI engine.

4. A system for providing an improved automated user troubleshooting experience, the system comprising:
    a processor; and
    a non-transitory computer-readable medium including instructions that when executed by the processor:
        trains an artificial intelligence ("AI") engine by:
            feeding first feed data to the untrained AI engine, the first feed data including feed parameters which are associated with one or more characteristics for leveraging to exclude potential issues;
            analyzing, by the untrained AI engine the first feed data;
            associating, by the untrained AI engine, the feed parameters to the characteristics;
            feeding first test data to the untrained AI engine, the first test data including test parameters which are unassociated with the characteristics;
            analyzing, by the untrained AI engine the test data;
            associating, by the untrained AI engine, the test parameters to the characteristics;
            validating that the untrained AI engine correctly matched the test parameters to the characteristics;
            feeding second feed data to the untrained AI engine, the second feed data including feed characteristics which are associated with one or more of a plurality of consecutive steps stored in a troubleshooting database;
            analyzing, by the untrained AI engine, the second feed data;

associating, by the untrained AI engine, the feed characteristics to the one or more of the plurality of consecutive steps;

feeding second test data to the untrained AI engine, the second test data including test characteristics which are unassociated with the one or more of the plurality of consecutive steps;

analyzing, by the untrained AI engine, the second test data;

associating, by the untrained AI engine, the test characteristics to the one or more of the plurality of consecutive steps;

validating that the untrained AI engine correctly matched the test characteristics to the one or more of the plurality of consecutive steps; and retraining the untrained AI engine until the validation steps reach a threshold of at least 95% correct matches;

receive a user inquiry at the AI engine;

parses the user inquiry to identify an issue category;

retrieves, from the troubleshooting database, a troubleshooting guide that:

relates to the issue category; and includes the plurality of consecutive steps used to identify an issue;

uses the AI engine to associate each of the plurality of steps with one or more of the characteristics;

uses the AI engine to associate each characteristic with one or more parameters, the presence of the one or more parameters indicating the characteristic is present;

retrieves user data associated with the characteristics from a user database and/or user device;

determines, by the AI engine before execution of the plurality of steps, one or more of the plurality of consecutive steps to skip based on the retrieved user data, determining the plurality of consecutive steps to skip comprises:

parsing the user data;

verifying whether one or more parameters of the one or more characteristics are present in the user data; and skipping each step of the plurality of consecutive steps associated with the characteristic whose associated parameters were verified to be present in the parsed user data;

executes, by the AI engine, non-skipped consecutive steps to identify the issue, wherein executing the non-skipped consecutive steps involves executing fewer steps than executing the plurality of consecutive steps;

determines resolution steps for a resolution to the issue based on the execution of the non-skipped consecutive steps; and executes the resolution steps, wherein the resolution steps include one or more of internet connectivity and internet cookie acceptance steps.

5. The method of claim 1 wherein upon verifying presence of an intervening characteristic in the user data, preventing the skipping of one or more steps.

6. The method of claim 1 further including repeating the training until the untrained AI engine produces only correct matches.

7. The method of claim 4 further including repeating the training until the untrained AI engine produces only correct matches.

8. The method of claim 4 further comprising upon completion of each non-skipped consecutive step prompting the user to indicate whether the respective non-skipped consecutive step was effective in identifying the issue.

9. The method of claim 8 wherein a user response to the prompt upon completion of each non-skipped consecutive step is used to recursively train the AI engine.

10. The method of claim 4 wherein upon verifying the presence of an intervening characteristic in the user data, preventing the skipping of one or more steps.

11. A method for improving an automated user troubleshooting system, the method comprising:

training an artificial intelligence ("AI") engine by:

feeding first feed data to the untrained AI engine, the first feed data including feed parameters which are associated with one or more characteristics for leveraging to exclude potential issues;

analyzing, by the untrained AI engine the first feed data;

associating, by the untrained AI engine, the feed parameters to the characteristics;

feeding first test data to the untrained AI engine, the first test data including test parameters which are unassociated with the characteristics;

analyzing, by the untrained AI engine the test data;

associating, by the untrained AI engine, the test parameters to the characteristics;

validating that the untrained AI engine correctly matched the test parameters to the characteristics;

feeding second feed data to the untrained AI engine, the second feed data including feed characteristics which are associated with one or more of a plurality of consecutive steps stored in a troubleshooting database;

analyzing, by the untrained AI engine, the second feed data;

associating, by the untrained AI engine, the feed characteristics to the one or more of the plurality of consecutive steps;

feeding second test data to the untrained AI engine, the second test data including test characteristics which are unassociated with the one or more of the plurality of consecutive steps;

analyzing, by the untrained AI engine, the second test data;

associating, by the untrained AI engine, the test characteristics to the one or more of the plurality of consecutive steps;

validating that the untrained AI engine correctly matched the test characteristics to the one or more of the plurality of consecutive steps; and retraining the untrained AI engine until the validation steps reach a threshold of at least 95% correct matches;

receiving a user inquiry at the AI engine;

parsing the user inquiry to identify an issue category;

retrieving, from the troubleshooting database, a troubleshooting guide that:

relates to the issue category; and includes the plurality of consecutive steps used to identify an issue;

using the AI engine to associate each of the plurality of steps with one or more of the characteristics;

using the AI engine to associate each characteristic with one or more parameters, the presence of the one or more parameters indicating the characteristic is present;

retrieving user data associated with the characteristics from a user database and/or user device;

determining, by the AI engine before execution of the plurality of steps, one or more of the plurality of consecutive steps to skip based on the retrieved user data, the determining comprising:

parsing the user data;

verifying whether one or more parameters of the one or more characteristics are present in the user data; and skipping each step of the plurality of consecutive steps associated with the characteristic whose associated parameters were verified to be present in the parsed user data;

executing, by the AI engine, non-skipped consecutive steps to identify the issue, wherein executing the non-skipped consecutive steps involves executing fewer steps than executing the plurality of consecutive steps;

determining resolution steps for a resolution to the issue based on the execution of the non-skipped consecutive steps; and executing the resolution steps, wherein the resolution steps include one or more of internet connectivity and internet cookie acceptance steps;

wherein:

at least one of the plurality of consecutive steps includes prompting the user for parameter related information; and the parameter related information is used to verify the presence of the one or more characteristics associated with the step in which the prompt was executed.

12. The method of claim 11 further including repeating the training until the untrained AI engine produces only correct matches.

\* \* \* \* \*